(12) United States Patent
Jiang et al.

(10) Patent No.: US 7,986,351 B2
(45) Date of Patent: Jul. 26, 2011

(54) LUMA ADAPTATION FOR DIGITAL IMAGE PROCESSING

(75) Inventors: Xiaoyun Jiang, San Diego, CA (US); Chinchuan Andrew Chiu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 955 days.

(21) Appl. No.: 11/052,710

(22) Filed: Jan. 27, 2005

(65) Prior Publication Data

US 2006/0164523 A1  Jul. 27, 2006

(51) Int. Cl.
| | |
|---|---|
| *H04N 9/68* | (2006.01) |
| *H04N 5/228* | (2006.01) |
| *G06K 9/00* | (2006.01) |
| *G06K 9/40* | (2006.01) |

(52) U.S. Cl. .............. 348/234; 348/222.1; 382/168; 382/274

(58) Field of Classification Search .............. 348/222.1, 348/229.1, 230.1, 234, 235, 236, 237, 238; 382/168, 169, 172, 254, 270, 273, 274, 276, 382/280
See application file for complete search history.

(56) References Cited

U.S. PATENT DOCUMENTS

| | | | |
|---|---|---|---|
| 5,450,502 A | 9/1995 | Eschbach et al. | |
| 5,696,595 A | 12/1997 | Yamanishi | |
| 5,799,106 A * | 8/1998 | Mooney et al. | 382/172 |
| 5,852,648 A * | 12/1998 | Miyamoto et al. | 378/62 |
| 6,080,104 A * | 6/2000 | Ozawa et al. | 600/180 |
| 6,111,607 A | 8/2000 | Kameyama | |
| 6,356,276 B1 | 3/2002 | Acharya | |
| 6,463,173 B1 | 10/2002 | Tretter | |
| 6,608,926 B1 | 8/2003 | Suwa et al. | |
| 6,643,398 B2 * | 11/2003 | Moriwaki | 382/167 |
| 6,731,798 B1 * | 5/2004 | Stearns | 382/172 |
| 6,741,736 B1 | 5/2004 | Jaspers | |
| 6,781,636 B2 * | 8/2004 | Stessen | 348/672 |
| 6,792,142 B1 | 9/2004 | Wang | |
| 6,826,310 B2 | 11/2004 | Trifonov et al. | |
| 7,013,044 B2 | 3/2006 | Wang | |
| 7,020,332 B2 | 3/2006 | Nenonen et al. | |
| 7,058,220 B2 | 6/2006 | Obrador | |
| 7,102,697 B2 * | 9/2006 | Lei et al. | 348/678 |
| 2002/0024609 A1 | 2/2002 | Matsushima | |
| 2002/0171663 A1 | 11/2002 | Kobayashi et al. | |

(Continued)

FOREIGN PATENT DOCUMENTS

EP       0833501       1/1998

(Continued)

OTHER PUBLICATIONS

Bhukhanwala, S., et al. (1993) Automated global enhancement of digitized photographs. IEEE Transactions on Consumer Electronics, vol. 40(1):1-10.

(Continued)

*Primary Examiner* — Jason Chan
*Assistant Examiner* — Peter Chon
(74) *Attorney, Agent, or Firm* — Timothy F. Loomis; James R. Gambale, Jr.

(57) ABSTRACT

Luma adaptation for digital image processing. Luminance signals are separated from sensor RGB signals representing an image. A transfer function is obtained from the luminance signals. Using the transfer function, the sensor RGB signals are adjusted to adapt the luma of the image.

22 Claims, 9 Drawing Sheets

U.S. PATENT DOCUMENTS

| | | | |
|---|---|---|---|
| 2004/0066979 | A1 | 4/2004 | Gindele et al. |
| 2004/0120599 | A1 | 6/2004 | Henley |
| 2004/0228522 | A1 | 11/2004 | Nakajima et al. |
| 2005/0238231 | A1 | 10/2005 | Ono et al. |

FOREIGN PATENT DOCUMENTS

| | | |
|---|---|---|
| EP | 1482724 | 1/2004 |
| JP | 2001118062 | 4/2001 |
| JP | 2002125130 | 4/2002 |
| JP | 2002204373 | 7/2002 |
| JP | 2004007202 | 1/2004 |
| JP | 2004342030 | 12/2004 |

OTHER PUBLICATIONS

Hoffmann, Steve. (2006) A practical guide to interpreting RGB histograms. http://www.sphoto.com/techinfo/histograms.htm, 3 pages.

Hoffmann, Steve. (2006) A practical guide to interpreting RGB histograms, p. 2. http://www.sphoto.com/techinfo/histograms2.htm, 6 pages.

Hoffmann, Steve. (2006) A practical guide to interpreting RGB histograms, p. 3. http://www.sphoto.com/techinfo/histograms3.htm, 6 pages.

Hoffmann, Steve. (2006) A practical guide to interpreting RGB histograms, p. 4. http://www.sphoto.com/techinfo/histograms4.htm, 7 pages.

Mancuso, et al. An introduction to the digital still camera technology. Article 1, pp. 1-9.

Messina, G., et al. (2003) Image quality improvement by adaptive exposure correction techniques. IEEE, ICME 2003, pp. I-549-I-552.

Pizer, S., et al. (1987) Adaptvie histogram equalization and its variations. Computer Vision, Graphics, and Image Processing 39:355-368.

DN100 Digital net Camera, Nikon Microscopy; http://www.microscopyu.com/articles/digitalimaging/dn100/whitebalance.html, 2 pages.

Bayer Filter, Wikipedia, the free encyclopedia. http://en.wikipedia.org/wiki/Bayer_filter, 2 pages.

Demosaicing, Wikipedia, the free encyclopedia. http://en.wikipedia.org/wiki/Demosaicing, 5 pages.

RGB color model, Wikipedia, the free encyclopedia. http://em.wikipedia.org/wiki/RGB_color_model, 7 pages.

Histograms: construction, analysis and understanding, http://quarknet.fnal.gov/toolkits/ati/histograms.html, 3 pages.

International Search Report and Written Opinion—PCT/US2006/002574, International Search Authority—European Patent Office—Jun. 28, 2006.

* cited by examiner

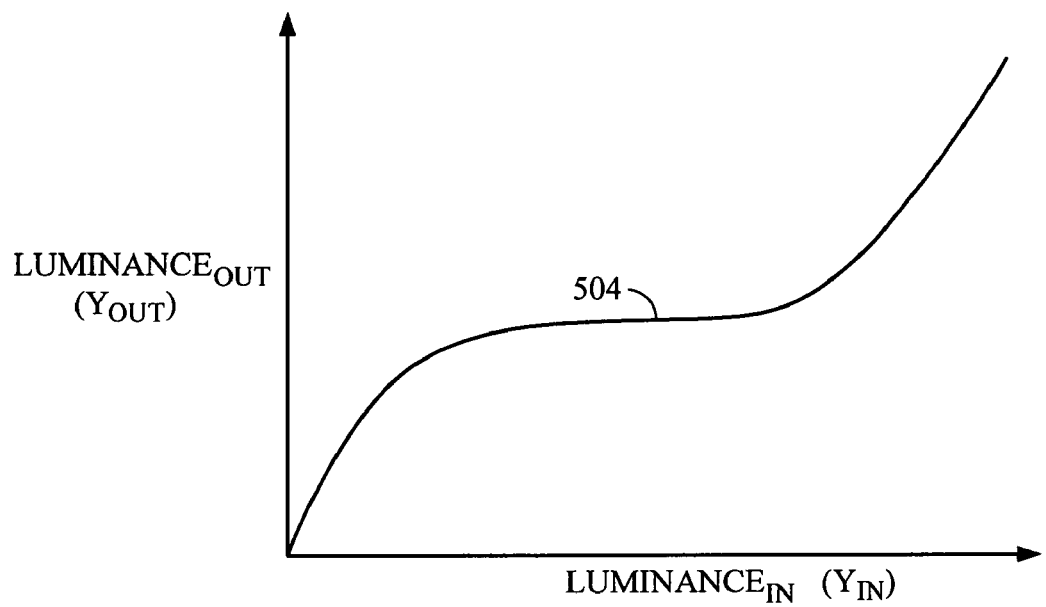
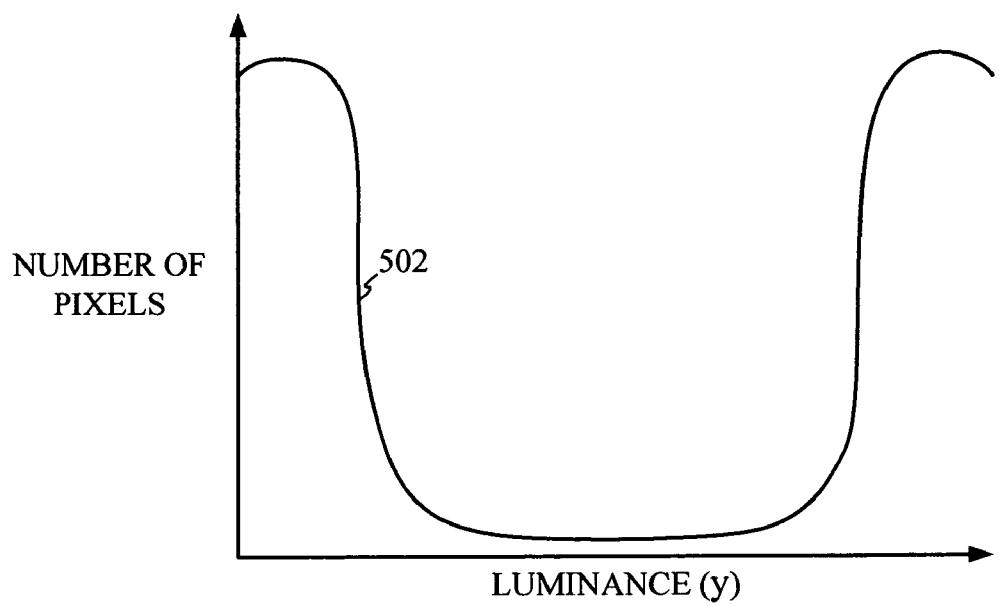
FIG. 5

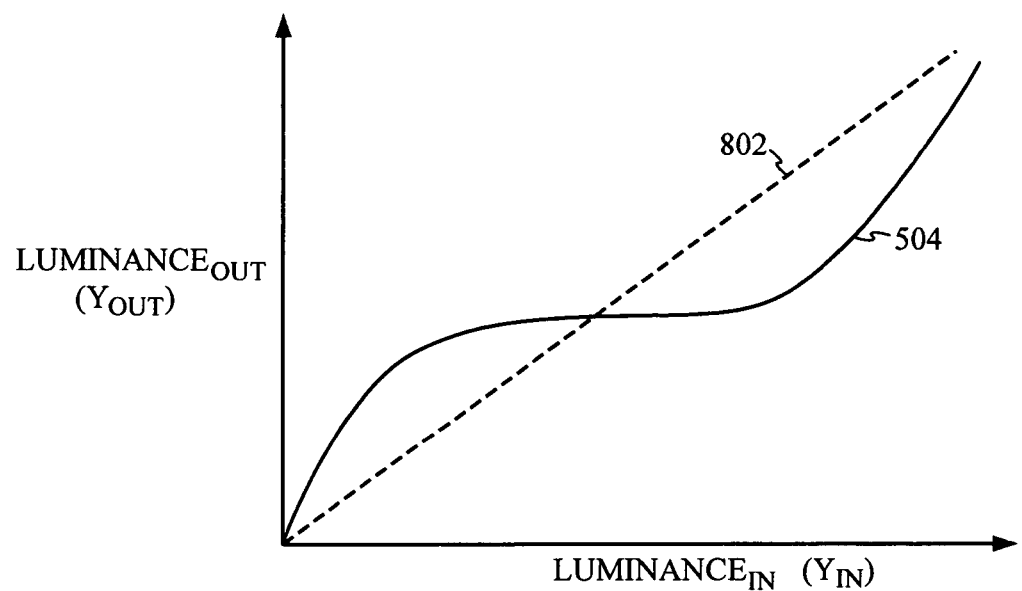
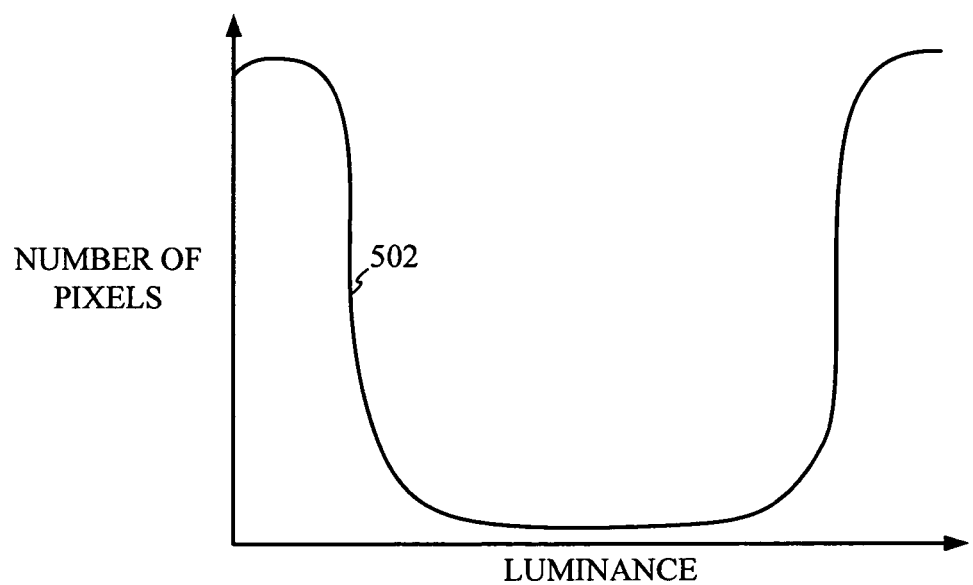
FIG. 8

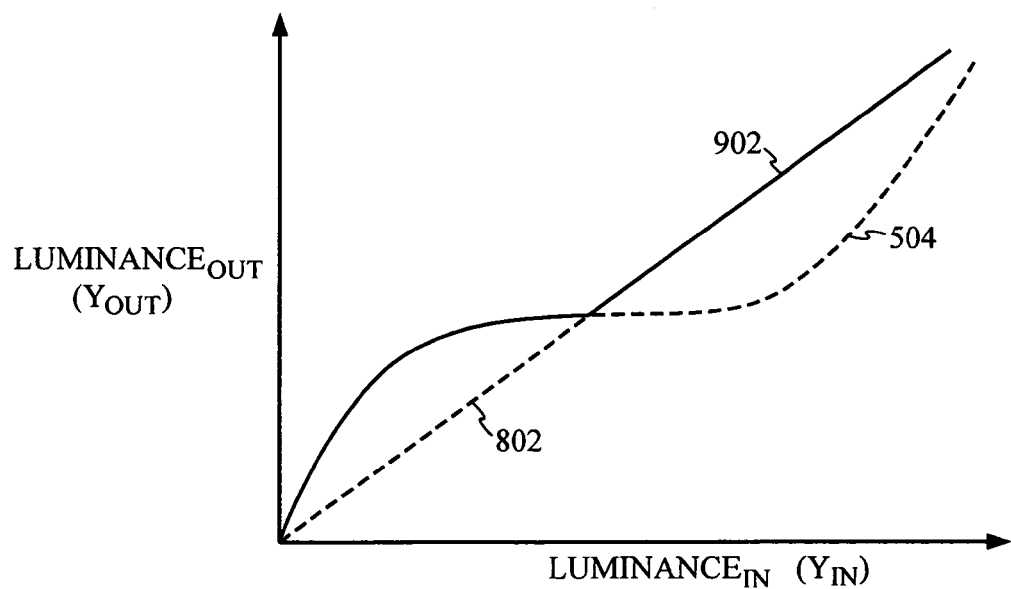
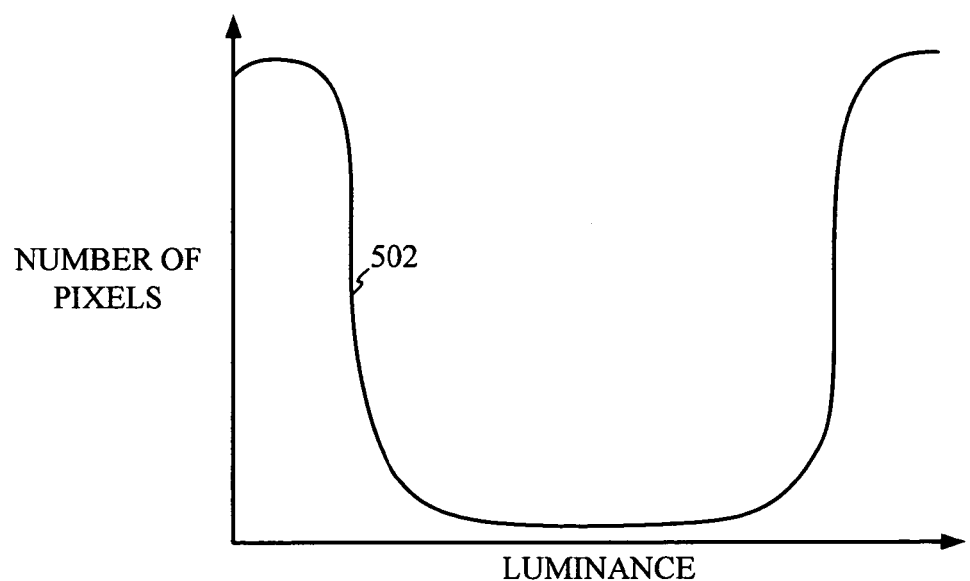
FIG. 9

LUMA ADAPTATION FOR DIGITAL IMAGE PROCESSING

BACKGROUND

1. Field

The present disclosure relates generally to digital imaging processing, and more particularly, to luma adaptation for digital image processing systems and processes.

2. Background

The demand for multimedia applications in mobile communications has been growing at an astounding rate. Today, a user can send and receive still images, as well as download images and video from the Internet, for viewing on a mobile terminal or handset. The integration of the digital camera into the mobile terminal has further contributed to the growing trend in mobile communications for multimedia functionality.

Given the limited amount of resources like battery capacity, processing power, and transmission speed associated with a mobile terminal, effective digital imaging processing techniques are needed to support multimedia functions. This requires the development of more sophisticated hardware and software that reduces computational complexity for multimedia applications while maintaining the image quality. The development of such hardware and software leads to lower power consumption and longer standby time for the mobile terminal.

One facet of the digital imaging process involves processing color information. Color information is generally represented as a composite signal consisting of red, green and blue (RGB) components. The data capacity required to convey this color information may be reduced by taking advantage of the relatively poor color acuity of the human eye, provided that the full luma bandwidth is maintained. In particular, the three color components (RGB) of the video signal may be transformed into luma (Y) and chroma ($C_bC_r$) components, and the chroma components compressed.

The luma (Y) component is generally associated with the brightness of the image. High dynamic range processing techniques are often employed in digital imaging processing systems to preserve the details of the image in the dark and light regions when the dynamic range of the scene is large. It would be desirable to achieve this with efficient processing resources suitable for mobile applications.

Luma adaptation is one type of high dynamic range image processing technique. It creates a non-linear tone reproduction curve which automatically varies according to the images' luminance distribution. The reproduction curve is generated based on the histogram information of images.

SUMMARY

A method of luma adaptation for digital image processing is disclosed. The method includes deriving luminance signals from sensor RGB signals representing an image, obtaining a transfer function from the luminance signals, and using the transfer function to adjust the sensor signals to adapt the luma of the image.

A luma adaptation processor is disclosed. The luma adaptation processor includes means for deriving luminance signals from sensor signals representing an image, means for obtaining a transfer function from the luminance signals, and means for adjusting the sensor signals, using the transfer function, to adapt the luma of the image.

Another aspect of a luma adaptation processor is disclosed. The luma adaptation processor includes a luminance converter configured to separate luminance signals from sensor signals representing an image, a transfer function generator configured to obtain a transfer function from the luminance signals, and a luma adaptation module configured to adjust the sensor signals using the transfer function.

Computer readable media embodying a program of instructions executable by a computer to perform a method of luma adaptation for digital image processing is also disclosed. The method includes deriving luminance signals from sensor RGB signals representing an image, obtaining a transfer function from the luminance signals, and using the transfer function to adjust the sensor RGB signals to adapt the luma of the image.

BRIEF DESCRIPTION OF THE DRAWINGS

Various embodiments are illustrated by way of example, and not by way of limitation, in the accompanying drawings, wherein:

FIG. 5 is a graphical representation illustrating a transfer function representing the cumulative function of the histogram shown in FIG. 4;

FIG. 8 is a graphical representation illustrating the compressed regions of the transfer function of FIG. 5; and FIG. 9 is a graphical representation illustrating a modified transfer function to eliminate the compressed regions.

DETAILED DESCRIPTION

The detailed description set forth below in connection with the appended drawings is intended as a description of various embodiments of luma adaptation and is not intended to represent the only embodiments in which luma adaptation may be practiced. The detailed description includes specific details for the purpose of providing a thorough understanding of luma adaptation. However, it will be apparent to those skilled in the art that luma adaptation may be practiced without these specific details. In some instances, well known structures and components are shown in block diagram form in order to avoid obscuring the concepts of luma adaptation.

Figure 1:
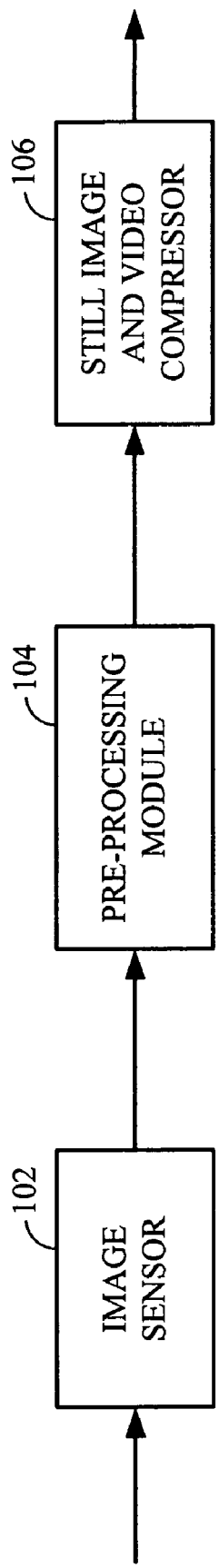
FIG. 1 is a conceptual block diagram illustrating a digital imaging process.

FIG. 1 is a conceptual block diagram illustrating a digital imaging process suitable for a digital camera integrated into a mobile terminal. The mobile terminal may be a wireless phone, personal digital assistant (PDA), laptop computer, or any other mobile wireless device. A lens (not shown) may be used to focus an image onto an image sensor 102. The image sensor 102 may be a charge-coupled device (CCD), a complimentary metal oxide semiconductor (CMOS) image sensor, or any other suitable image sensor. In at least one embodiment of the image sensor 102, an array of semiconductors may be used to capture light at different pixels of the image. A color filter array (CFA) (not shown) positioned in front of the image sensor 102 may be used to pass a single color (i.e., red, green or blue) to each semiconductor. The most common CFAs are RGB and CMYG patterns. The sensor signals produced by the image sensor 102 may be provided to a pre-processing module 104 where they are demosaiced in order to obtain full RGB resolution as an input to the still image and video compressor 106. The still image and video compressor 106 may use JPEG compression, or any other suitable compression algorithm.

Figure 2:
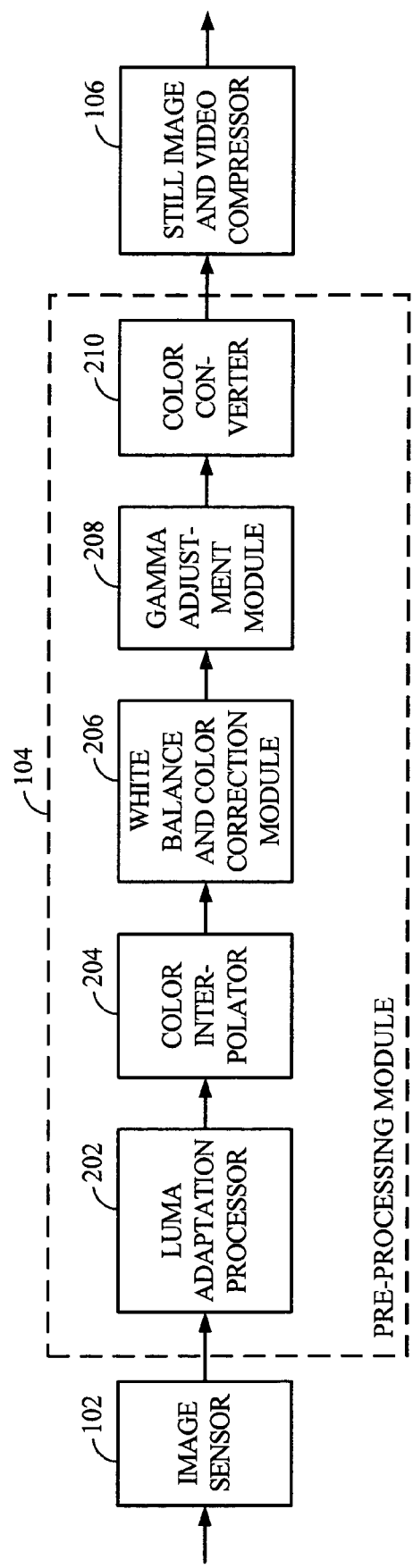
FIG. 2 is a conceptual block diagram illustrating the functionality of a pre-processing module in a digital image processing system.

FIG. 2 is a conceptual block diagram illustrating the functionality of the pre-processing module. The pre-processing module 104 may be used to compensate for differences between the responses of human visual system and sensor signals generated by the image sensor 102. These differences may be corrected using various processing techniques including, by way of example, luma adaptation, demosaicing, white balance, color correction, gamma adjustment and color conversion. These processes are represented in FIG. 2 as separate processing modules, but alternatively may be performed using a shared hardware or software platform.

Referring to FIG. 2, a luma adaptation processor 202 may be used to apply luma adaptation to the sensor RGB signals. The luma adapted RGB signals may be provided to a color interpolator 204. The color interpolator 204 may be used to convert the sensor RGB signals to full resolution RGB signals through an interpolation process. The full resolution RGB signals provide red, green and blue color information at every pixel of the image. A white balance and color correction module 206 module may be used to compensate for differing color temperatures of illuminations and the color differences caused by sensors, and a gamma adjustment module 208 may be used to compensate for the non-linear effects introduced by, say, the display (not shown) of the mobile terminal. A color conversion module 210 may be used to reduce the data capacity required to transmit the image downstream by transforming the nonlinear (gamma corrected) R'G'B' signals into luma (Y') and chroma ($C_b C_r$) signals. Color detail can then be reduced by subsampling the chroma signals, provided that the full bandwidth of the luma signals is maintained.

Figure 3:
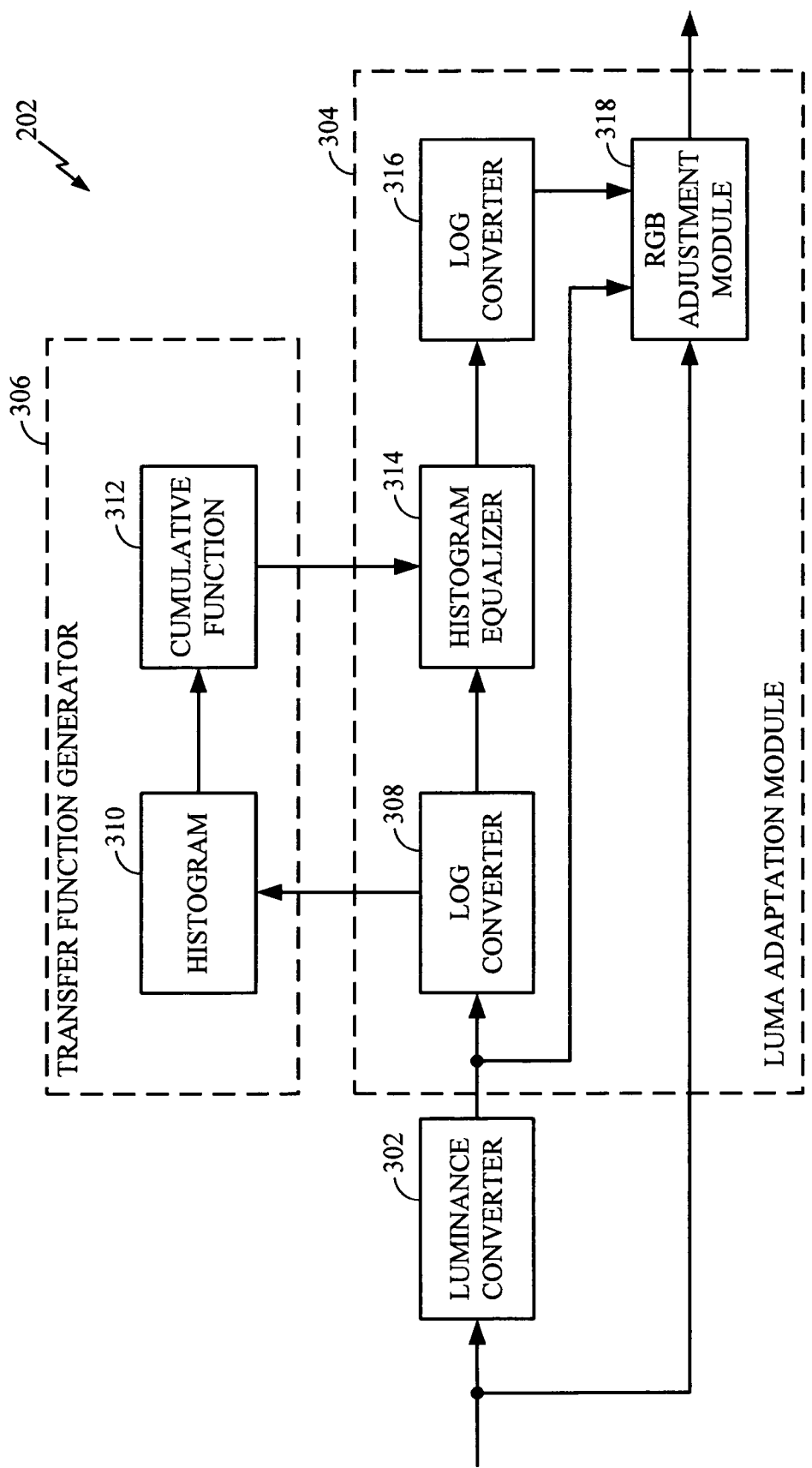
FIG. 3 is a conceptual block diagram illustrating the functionality of a luma processor associated with pre-processing in a digital image processing system.

FIG. 3 is a conceptual block diagram illustrating the functionality of the luma processor. The luma processor 202 may be integrated into the pre-processing module 104 (see FIG. 2), and implemented with a microprocessor, digital signal processor (DSP), or any other hardware and/or software based processing entity in the pre-processing module 104. Although shown as part of the pre-processing module 104 in FIG. 2, the luma adaptation processor 202 may be implemented with a stand-alone processor that communicates with the pre-processing module 104. The stand-alone processor may be a microprocessor, DSP, programmable logic or dedicated hardware. Alternatively, the functionality of the luma processor 202 may be distributed among any number of processing entities in the pre-processing module 104 and/or other processing entities in the mobile terminal.

Referring to FIG. 3, a luminance converter 304 may be used to derive the luminance (Y) signals from the sensor RGB signals. The luminance (Y) signal for every pixel of the image may be obtained through the transformation of its neighbor 3×3 RGB signals as shown in Equation (1):

$$Y = \begin{bmatrix} s_1 & s_2 & s_3 \\ s_4 & \bar{s} & s_5 \\ s_6 & s_7 & s_8 \end{bmatrix} \cdot \begin{bmatrix} 1/16 & 1/8 & 1/16 \\ 1/8 & 1/4 & 1/8 \\ 1/16 & 1/8 & 1/16 \end{bmatrix} \quad (1)$$

where: $\bar{s}$ is the RGB signal of interest; and
$s_1 \sim s_8$ are the neighboring 3×3 RGB signals For example when the center pixel is B, and its neighboring pixels are arranged as $$\begin{bmatrix} R & G & R \\ G & B & G \\ R & G & R \end{bmatrix},$$

the corresponding Y value will be $$Y = \frac{1}{4}R + \frac{1}{2}G + \frac{1}{4}B \quad (2)$$

When the center pixie is R such as $$\begin{bmatrix} B & G & B \\ G & R & G \\ B & G & B \end{bmatrix}$$

or when the center pixel is G such as $$\begin{bmatrix} G & B & G \\ R & G & R \\ G & B & G \end{bmatrix},$$

the corresponding Y values still follow Equation (2).

Figure 4:
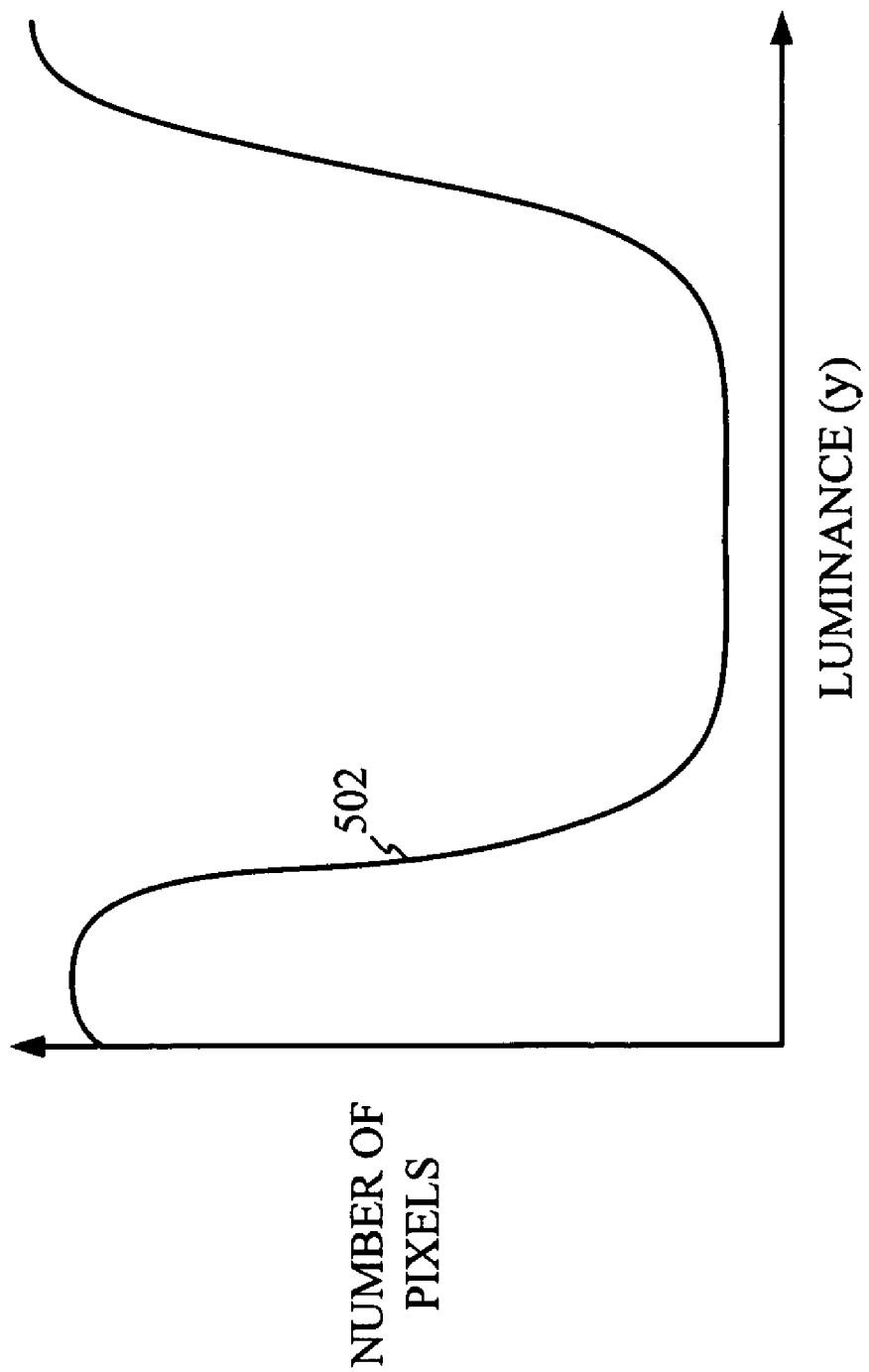
FIG. 4 is a graphical representation illustrating a simplified histogram of an image with a light source in a dark environment.

A luma adaptation module 304 may be used to recover the details of the image in the dark and light regions. In at least one embodiment, luma adaptation may be performed through histogram modeling techniques. A "histogram" is a plot of an image which shows the number of image pixels at each luminance or gray scale level. The peaks in the histogram represent the more common luminance levels in the image, and the valleys between the peaks represent the less common luminance levels in the image. An example of a histogram with a light source in a relatively dark environment is shown in FIG. 4. The histogram of the image exhibits peaks in the dark and white regions, but is relatively flat in the mid-level gray regions. In this histogram, it is clear that the gray scale is underutilized. The gray scale may be better utilized by spreading out the gray scale levels in the peak areas, while compressing them in the valleys so that the luminance distribution across the image is more even. This process is called "histogram equalization."

Returning to FIG. 3, the luma adaptation module 304 may employ a histogram equalization process to reassign the luminance signals in the input image such that the output image contains a relatively uniform distribution of luminance signals (i.e., a flat histogram). This makes it possible to see details in dark and white regions that were imperceptible in the original image. A transfer function for the original image may be used to reassign the luminance signals. The transfer function may be generated from the histogram of the original image. A transfer function generator 306 may be used to generate the cumulative function of the histogram for the original image and provide it to the luma adaptation module 304 as the transfer function.

FIG. 5 is a graphical illustration showing an example of a transfer function representing the cumulative function of the histogram shown in FIG. 4. The histogram 502 of the image is shown with peaks in the dark and white regions, but is relatively flat in the mid-level gray regions. A cumulative function 504 of the histogram 502 may be represented by a curve that plots the luminance signals between the input and output image. The slope of the curve varies proportionally to the number of pixels in the original image having a particular luminance level. That is, the curve has a steep slope in the black and white regions of the gray scale where the histogram peaks, and a flat slope in the mid-level gray regions.

Figure 6:
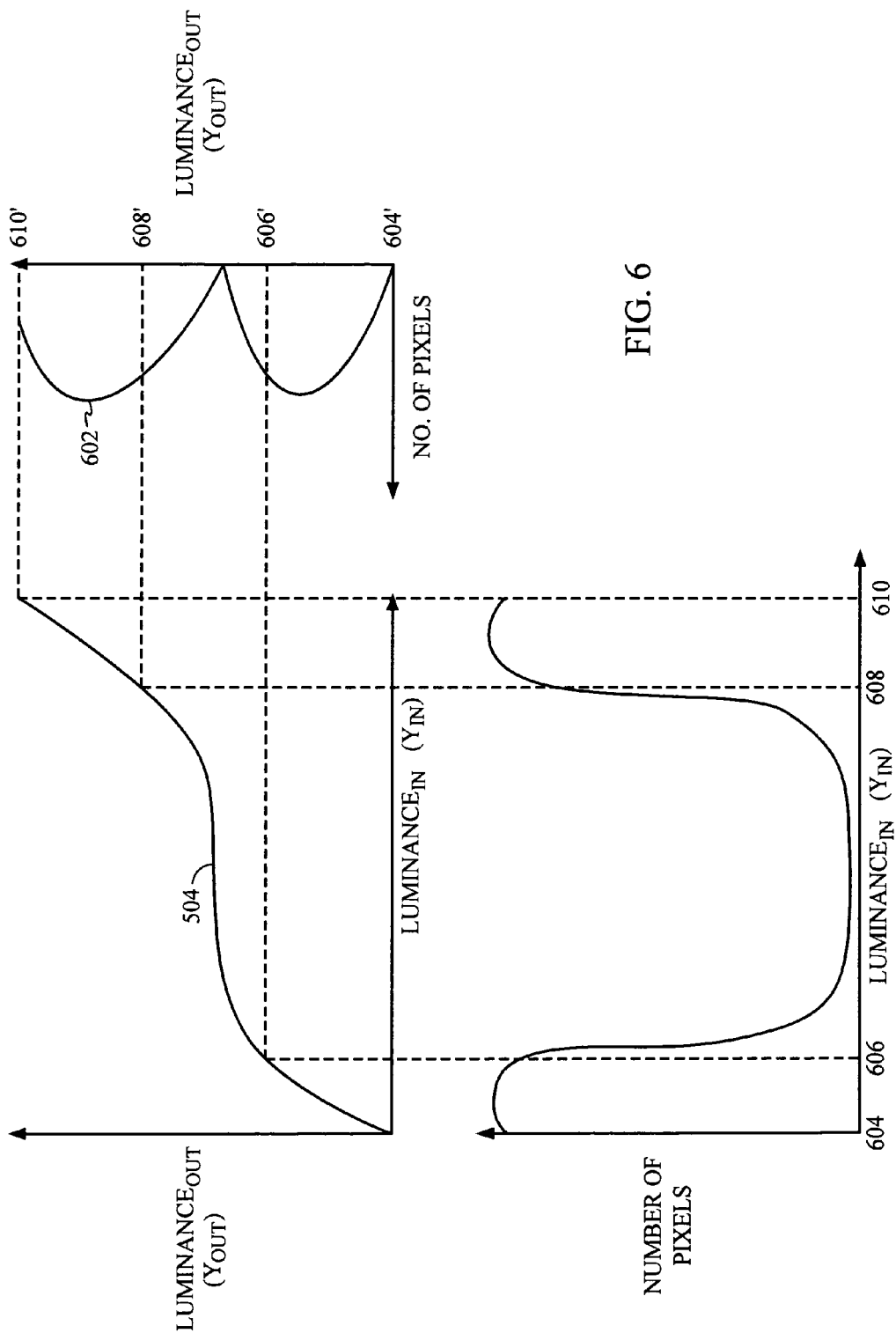
FIG. 6 is a graphical representation illustrating the histogram equalization process using the transfer function of FIG. 5.

FIG. 6 is another graphical illustration showing the histogram equalization process using the transfer function. The transfer function is the cumulative function 504 of the histogram 502 in FIG. 4. All pixels in the input image with luminance signals between 604 and 606 in the black region of the histogram 502 will be reassigned to a wider range between 604' and 606' in the equalized histogram 602. Similarly, all pixels in the input image with luminance signals between 608 and 610 in the white region of the histogram 502 will be reassigned to a wider range between 608' and 610' in the equalized histogram 602. The equalized histogram 602 allocates more dynamic range to black and white regions of the gray scale, where it is needed. The mid-level gray portion, where relatively few pixels exist, is allocated a smaller portion of the dynamic range.

Returning to FIG. 3, histogram equalization may be based on a logarithmic distribution of the luminance signals to better approximate the response of the human eye. A log converter 308 may be used to transform the luminance signals from the linear domain to the logarithmic domain. The transfer function generator 306 may be used to generate a cumulative function for the histogram of the logarithmic luminance signals. The resultant transfer function may then be used by the histogram equalizer 314 in the luma adaptation module 304 to reassign the logarithmic luminance signals to more effectively utilize the dynamic range of the gray scale in the black and white regions of the image. The reassigned luminance signals may then be transformed back into the linear domain by a log converter 316 at the output of the histogram equalizer 314.

An RGB signal adjustment module 318 may be used to adjust the sensor RGB signals input to the luma adaptation processor 202. The sensor RGB signal input is adjusted as a function of its luminance signals ($Y_{in}$) and the luminance signals from the equalized histogram ($Y_{out}$). This adjustment is performed in the linear domain and may be represented by the following equation:

$$(\text{Sensor } RGB \text{ signal})_{Adjusted} = \frac{Y_{out}}{Y_{in}} (\text{Sensor } RGB \text{ signal}) \qquad (2)$$

In at least one embodiment of the transfer function generator 306, the transfer function may be constrained in two ways in order to limit the contrast of the overall image. The first constraint may be applied on the histogram. As discussed in greater detail earlier, the slope of the transfer function varies proportionally with the number of pixels in the original image having a particular luminance level. When the slope of the transfer function is too steep, the contrast of the resulting image may be too high, or an undesirable amount of noise may be introduced into the image. A histogram module 310 may be used to create a histogram with a cap that limits the number of pixels for each given luminance level. By capping the number of pixels, the slope of the transfer function can be better controlled. In this configuration, the number of pixels per each luminance level should satisfy the following equation:

$$f(p_i) \leq K \cdot \frac{P_{TOTAL}}{N_{LEVELS}} \qquad (3)$$

where: $p_i$ is the number of pixels in the $i^{th}$ luminance level of the gray scale;

$p_{TOTAL}$ is the total number of pixels in the image;

$N_{LEVEL}$ is the number of luminance levels in the gray scale; and

K is an empirical constant.

Figure 7:
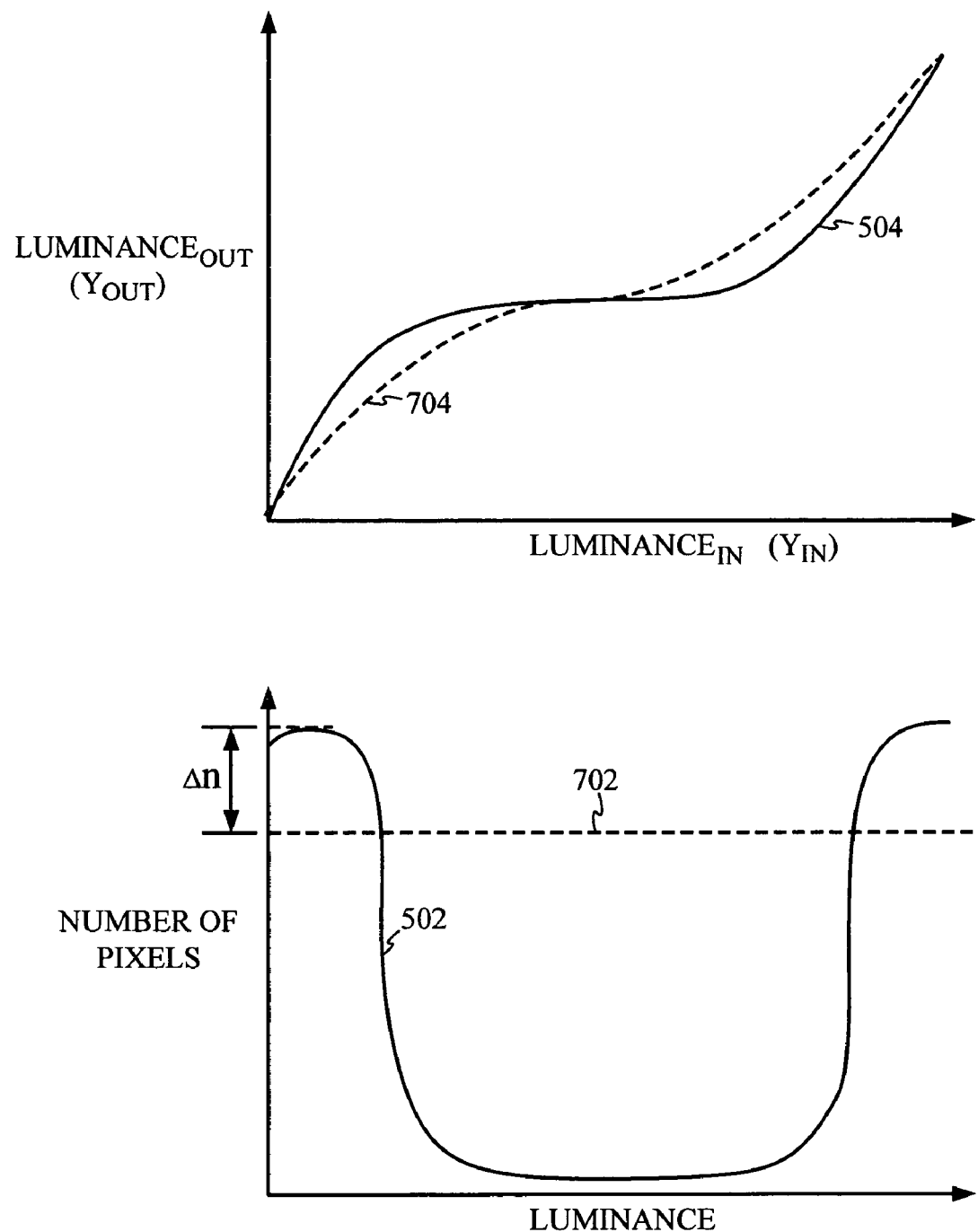
FIG. 7 is a graphical representation illustrating the effect on the cumulative function of the histogram of FIG. 4 when the height of the histogram is limited.

FIG. 7 is a graphical illustration showing the effect on the cumulative function of the histogram of FIG. 4. The broken line 702 extending though the gray scale represents the cap (i.e., maximum number of pixels per luminance level). The cap reduces the height of the peaks in the black and white regions of the histogram by "Δh." The reduction in peak height reduces the slope of the transfer function in the black and white regions as shown by the curve 704 representing the cumulative function of the capped histogram.

The second constraint may be applied to the transfer function, that is, the cumulative function. In some cases, the transfer function may compress some region of the gray scale in order to increase the overall image contrast. The portion of the gray scale where compression is occurring in the transfer function of FIG. 4 is shown in FIG. 8. A broken straight line 802 in the logarithmic domain is used to represent a transfer function where the reproduced image is the same as the original image. The portion of the transfer function 504 that is below the broken straight line 802 represents a region exhibiting compression. Since the general purpose of the luma adaptation is to reproduce the shadow details and also keep the bright part, or to decrease the contrast of the original images, it is undesirable for the contrast of those wide dynamic range images to be increased ever more. Therefore, another constraint on the transfer function may be to limit the reproduced luminance signals such that they are never darker than the original image. In particular, the portion of the transfer function 504 below the straight line 802 is replaced by the straight line, the portion of the transfer function 504 above the straight line 802 is kept. The final transfer function is shown in FIG. 9. It is a combination of the straight line 802 and the original transfer function 504 from FIG. 8.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description of the disclosed embodiments is provided to enable any person skilled in the art to practice luma adaptation. Various modifications to these embodiments will be readily apparent to those skilled in the art, and the generic principles defined herein may be applied to other embodiments without departing from the spirit or scope of the teachings herein. Thus, the scope of the disclosure is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of luma adaptation for digital image processing, comprising:
    deriving luminance signals from sensor RGB signals representing an image; obtaining a transfer function from the luminance signals, wherein the transfer function comprises a cumulative function of a histogram for the luminance signals;
    using the transfer function to adjust the sensor RGB signals to adapt the luma of the image;
    limiting the peak of the histogram by excluding pixel counts per luminance level exceeding a cap, the cap being, for at least one luminance level, determined, at least in part, by the total number of pixels in the image and the total number of luminance levels, and is less than the actual number of pixels at that luminance level in the sensor RGB signals, the cap causing the transfer function to be determined from fewer pixels than are in the image; and
    modifying a region of the transfer function such that each of the sensor RGB signals in the region is not lighter than its respective adjusted sensor RGB signal, the region of the transfer function modified determined at least in part by the number of excluded pixel counts.

2. The method of claim 1 wherein the transfer function is used to adjust the sensor RGB signals by applying the transfer function to the luminance signals and using the result to adjust the sensor RGB signals.

3. The method of claim 1 wherein the histogram is for the logarithm of the luminance signals.

4. The method of claim 1 wherein the histogram is for the logarithm of the luminance signals.

5. The method of claim 1 wherein the sensor RGB signals are adjusted by converting an equalized histogram for the luminance signals into the adjusted RGB signals, the transfer function being used to generate the equalized histogram.

6. The method of claim 1, wherein the cap is determined, at least in part, by the total number of pixels in the image and the total number of luminance levels.

7. A luma adaptation processor, comprising:
    means for separating luminance signals from sensor RGB signals representing an image,
    means for limiting the peak of the histogram by excluding pixel counts per luminance level wherein the limiting means comprises a threshold, the threshold determined, at least in part, by the total number of pixels in the image and the total number of luminance levels;
    means for obtaining a transfer function from the luminance signals, wherein the transfer function comprises a cumulative function of a histogram for the luminance signals, the means for limiting the peak causing the transfer function to be determined from fewer pixels than are in the image;
    means for modifying the transfer function such that each of the sensor RGB signals is at least as dark as its respective adjusted sensor RGB signal, wherein said means for modifying produces a modified transfer function by replacing those portions of the transfer function, for luminance levels at which the transfer function does not increase the luminance, with a function that represents original sensor values, the portions for which the transfer function does not increase the luminance determined at least in part by the number of excluded pixel counts; and
    means for adjusting the sensor RGB signals, using the modified transfer function, to adapt the luma of the image.

8. The luma adaptation processor of claim 7 further comprising means for converting the luminance signals into the logarithmic domain, the transfer function being obtained from the logarithmic luminance signals.

9. A luma adaptation processor, comprising:
    a luminance converter configured to separate luminance signals from sensor RGB signals representing an image;
    a transfer function generator configured to obtain a transfer function from the luminance signals, wherein the transfer function comprises a cumulative function of a histogram for the luminance signals, and wherein the transfer function generator is further configured to limit the peak of the histogram by excluding pixel counts per luminance level exceeding a cap, the cap being, for at least one luminance level, determined, at least in part, by the total number of pixels in the image and the total number of luminance levels, and is less than the actual number of pixels at that luminance level in the sensor RGB signals, the cap causing the transfer function to be determined from fewer pixels than are in the image; and
    a luma adaptation module configured to adjust the sensor RGB signals using the transfer function, the adjustment determined at least in part by the number of excluded pixel counts.

10. The luma adaptation processor of claim 9 wherein the luma adaptation module is further configured to apply the transfer function to the luminance signals and use the result to adjust the sensor RGB signals.

11. The luma adaptation processor of claim 9 wherein the luma adaptation module is further configured to convert an equalized histogram for the luminance signals into the adjusted RGB signals, the transfer function being used to generate the equalized histogram.

12. The luma adaptation processor of claim 9 wherein the luma adaptation module further comprises a logarithmic converter configured to transform the luminance signals into the logarithmic domain, the histogram being for the logarithmic luminance signals.

13. The luma adaptation processor of claim 9 wherein the transfer function generator is further configured to modify the transfer function such that each of the sensor RGB signals is lighter than its respective adjusted sensor RGB signal.

14. The luma adaptation processor of claim 13 wherein the luma adaptation module further comprises a logarithmic converter configured to transform the luminance signals into the logarithmic domain, the histogram being for the logarithmic luminance signals.

15. The luma adaptation processor of claim 9 wherein the luma adaptation module further comprises a logarithmic converter configured to transform the luminance signals into the logarithmic domain, the transfer function being obtained from the logarithmic luminance signals.

16. The processor of claim 9, wherein the cap is determined, at least in part, by the total number of pixels in the image and the total number of luminance levels.

17. Computer readable media embodying a program of instructions executable by a computer to perform a method of luma adaptation for digital image processing, the method comprising:
 deriving luminance signals from sensor RGB signals representing an image;
 obtaining a transfer function from the luminance signals, wherein the transfer function comprises a cumulative function of a histogram for the luminance signals, the peak of the histogram limited by excluding pixel counts above at least one threshold value, wherein the threshold is determined, at least in part, by the total number of pixels in the image and the total number of luminance levels, the at least one threshold value causing the transfer function to be determined from fewer pixels than are in the image;
 modifying the transfer function by replacing those portions of the transfer function which do not increase the luminance, with a function that represents original sensor values, thereby producing a modified transfer function, such that each of the sensor RGB signals is at least as dark as its respective adjusted sensor RGB signal, the replaced portions determined at least in part by the number of excluded pixel counts; and
 using the modified transfer function to adjust the sensor RGB signals to adapt the luma of the image.

18. The computer readable media of claim 17 wherein the modified transfer function is used to adjust the sensor RGB signals by applying the modified transfer function to the luminance signals and using the result to adjust the sensor RGB signals.

19. The computer readable media of claim 17 wherein the histogram is for the logarithm of the luminance signals.

20. The computer readable media of claim 17 wherein the histogram is for the logarithm of the luminance signals.

21. The computer readable media of claim 17 wherein the sensor RGB signals are adjusted by converting an equalized histogram for the luminance signals into the adjusted RGB signals, the transfer function being used to generate the equalized histogram.

22. The computer readable media of claim 17, wherein the at least one threshold value is determined, at least in part, by the total number of pixels in the image and the total number of luminance levels.

* * * * *